(12) United States Patent
Weder et al.

(10) Patent No.: US 6,375,000 B1
(45) Date of Patent: Apr. 23, 2002

(54) HUMIDIFIER

(76) Inventors: Josef Anton Weder, Im Ebnet 5;
Ahmed Ediz, Albisstrasse 29, both of 8800 Thalwil (CH)

( * ) Notice: Subject to any disclaimer, the term of this patent is extended or adjusted under 35 U.S.C. 154(b) by 0 days.

(21) Appl. No.: 09/514,430

(22) Filed: Feb. 28, 2000

(51) Int. Cl.[7] .............................................. B65D 85/10
(52) U.S. Cl. ..................... 206/204; 206/205; 206/213.1
(58) Field of Search ................................. 206/205, 204, 206/213.1, 314, 242

(56) References Cited

U.S. PATENT DOCUMENTS

| | | | | |
|---|---|---|---|---|
| 2,740,683 A | * | 4/1956 | June ............................ | 312/31 |
| 3,847,722 A | * | 11/1974 | Kistner ......................... | 428/76 |
| 4,674,630 A | * | 6/1987 | Kirck .......................... | 206/205 |
| 4,934,524 A | * | 6/1990 | St Charles ................... | 206/204 |
| 4,997,082 A | * | 3/1991 | Durocher ..................... | 206/204 |
| 5,037,459 A | * | 8/1991 | Spruill et al. ................. | 96/118 |
| 5,829,581 A | * | 11/1998 | Wicker ..................... | 206/213.1 |

* cited by examiner

*Primary Examiner*—Mickey Yu
*Assistant Examiner*—Troy Arnold
(74) *Attorney, Agent, or Firm*—Notaro & Michalos P.C.

(57) ABSTRACT

In order to stabilize the air humidity in a musical instrument case, in a protective container 7 with interior openings 9 and further within a mesh bag, a hydrophilic polymer activated with water is provided. Protective container 7 with mesh bag 1 and stabilizer substance are disposed in the instrument case.

2 Claims, 3 Drawing Sheets

HUMIDIFIER

Figure 1:
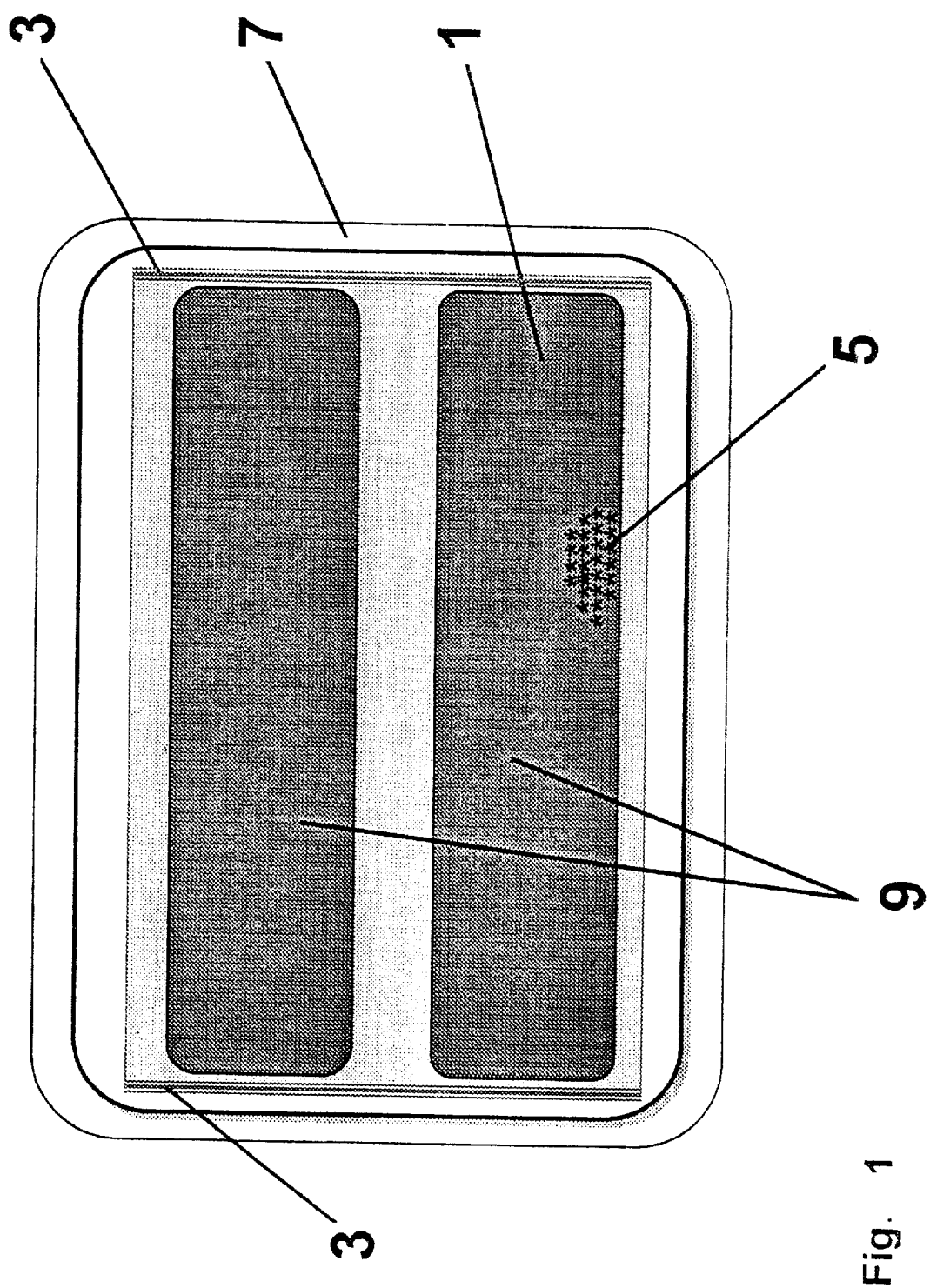

The present invention relates to a humidity stabilizer, in particular for a musical instrument case.

In particular stringed instruments, and therein especially bowed stringed instruments, react highly sensitively with respect to tone quality to ambient air humidity and its fluctuations. This applies in the case of bowed instruments for the instrument proper as well as also for the bow. For optimum [musical] sound a relative air humidity [r.a.h.] of maximum constancy of 50% to 60% r.a.h. is desired. In particular, in dry zones such as for example in high-altitude valleys of the Alps, in aircraft or also during the winter, the ambient air humidity is customarily not sufficient to ensure optimum [musical] sound quality. In general, in the case of wooden instruments and thus also in the case of woodwind instruments, with too low a relative air humidity or with severe air humidity fluctuations, for example through rapid weather changes or transport of the instrument, mechanical degradation of wood [musical] sound bodies must also be anticipated, such as the development of cracks, in the case of wind instruments their warping to the point of jamming of the valve mechanisms.

It is therefore the goal to maintain in a musical instrument case or trunk an air humidity of 50 to 60% r.a.h. at maximum constancy, largely independently of, in particular, too low an ambient air humidity and of large fluctuations of the ambient air humidity.

From U.S. Pat. No. 3,407,700 a humidity stabilizer is known which, in the form of tubing, comprises a sponge-like core which is moistened through openings in the tubing sheath and through these openings subsequently also gives off moisture. This stabilizer is inserted through the f-shaped holes of bowed instruments into their interior.

This approach is extraordinarily disadvantageous and hardly practical; the danger is given that liquid moisture-retaining substance uncontrollably comes directly into contact with the interior of the instrument which can lead to lasting damage and that, in addition to the degradation of the tone reproduction with stabilizers, as advised, left in the instrument during the playing, the insertion of the stabilizer into the instrument, precisely with bowed instruments, entails the danger of disturbing the sound post with the accompanying known drastic effects caused thereby onto the behavior of the instrument.

Moreover, the stabilizer described in this publication (U.S. Pat. No. 3,407,700) is only capable of maintaining and stabilizing the air humidity in a musical instrument case for approximately two days. This may be one reason why the known stabilizer is inserted into the instrument, namely in order to utilize at least optimally the stabilization effect which, per se, is low.

It is the task of the present invention to eliminate the stated disadvantages of the prior known stabilizers. This is achieved thereby that the air humidity stabilizer according to the invention comprises a stabilizer substance in the form of a hydrophilic water-absorbing polymer.

Preferably as the stabilizer substance is therein used a cross-linked hydrophilic polymer, preferably a polyacrylic acid salt, therein further in particular preferred cross-linked polyacrylic acid sodium salts. This substance can therein be provided —non activated—in film form or, and today especially preferred, in powder form.

The precise chemical structure of the stabilizer substance used is less important in connection with the present invention; the main point is that the stabilizer substance used according to the invention, such as in particular cross-linked polyacrylic acid sodium salts in powder form, has a pronounced high capability for water absorption. In addition, it is critical that the stabilizer substance used according to the invention absorbs water very rapidly and, while expanding to a multiple of its original volume, forms a gel.

For example, Luquasorb® AF1 (Luquasorb® AF1: registered trademark of BASF/Germany) cross-linked polyacrylic acid sodium salt available on the market, which is already used in a number of applications, such as, for example, baby diapers, has in powder form a water absorption capability of up to 40g/100 mg polymer, and 30 g of water are absorbed in approximately 2.5 minutes.

If, as is preferred, the stabilizer substance, provided inactivated and in powder form, is introduced into a container permeable to moisture, preferably into a screen-mesh container, therein in particular preferred comprising a polyamide fabric, i.e. into a polyamide bag which is, for example, at least on one side welded together. The pore size of such a bag, on the one hand for securing maximum moisture circulation, is selected to be large, on the other hand, preferably only of such a size that no liquid or no powder can exude from it. It has been found that a pore size of 70 $\mu$m to 120 $\mu$m, therein in particular of approximately 90 $\mu$m at a thread thickness significantly less than the pore size is optimal.

The air humidity stabilizer according to the invention is, in any event, provided outside of the musical instrument at some site in the case or the trunk of the musical instrument and specifically such that a wet degradation of the instrument or further important pieces sensitive to humidity, such as the bow, is out of the question. The maintenance of a relative air humidity of 50 to 60% r.a.h. is further extremely advantageous, in addition for the instrument including, if appropriate, the bow, also for [colophone] rosin customarily carried in cases for bowed instruments; its capability for bowing is significantly better than when it is completely dried out. If desired, with the present invention it is also possible to maintain with the present invention a different constant air humidity, for example around 30% or around 80% r.a.h.

In order to exclude in any event the wet degradation of the content of the case or trunk of the instrument, it is further suggested to provide a security container such as a hard plastic protective container wherein the substance is accommodated, if appropriate with the moisture-permeable container preferably being exchangeable. On the protective container at least one interior large air inlet opening, which permits the complete ventilation of the substance, potentially through the moisture-permeable container. The stabilizer according to the invention is either integrated directly into the instrument case, in the case of newly manufactured instrument case, or is manufactured and distributed as a component part and, such as for example by means of Velcro tape, fixed in the instrument case.

Figure 2:
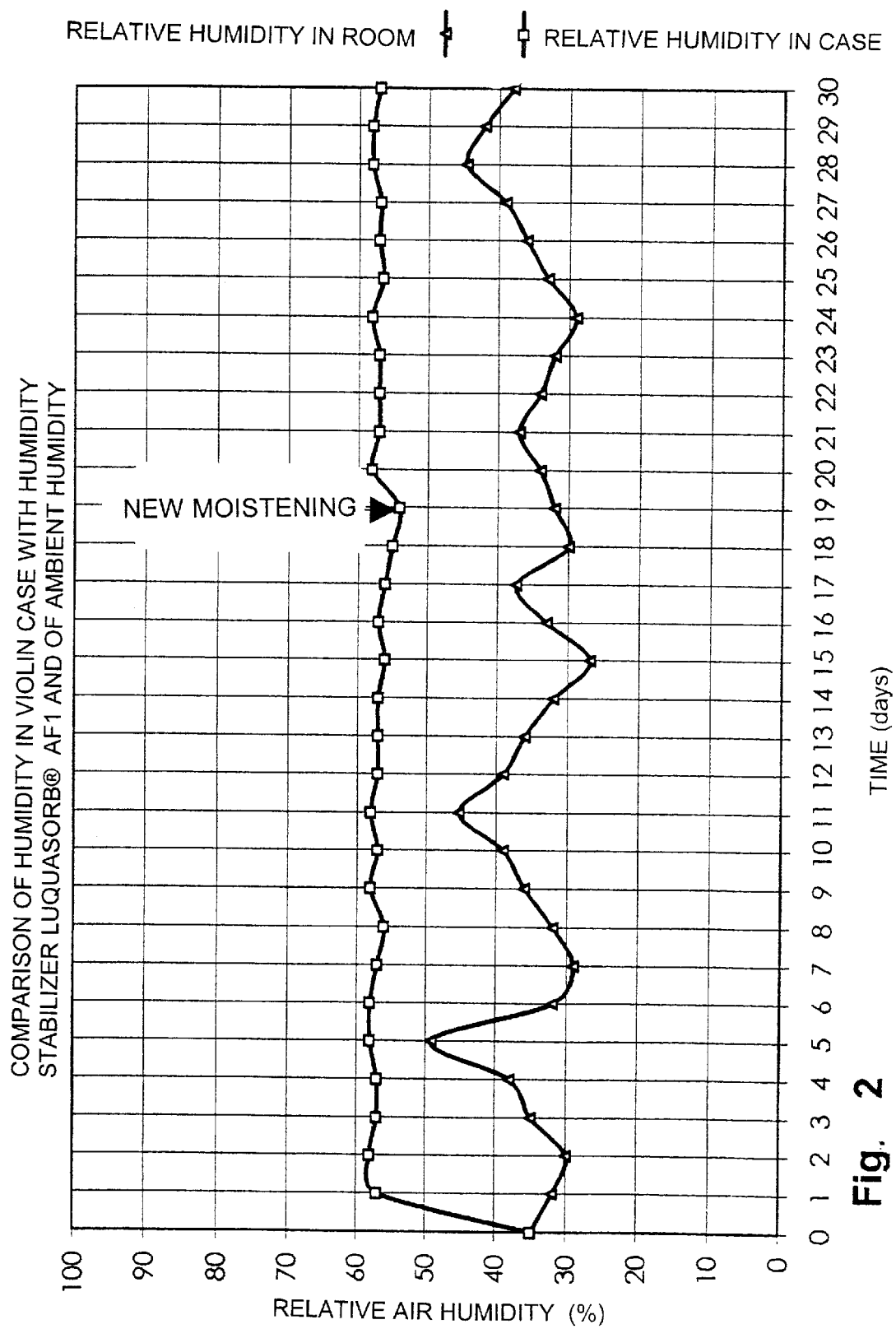
Figure 3:
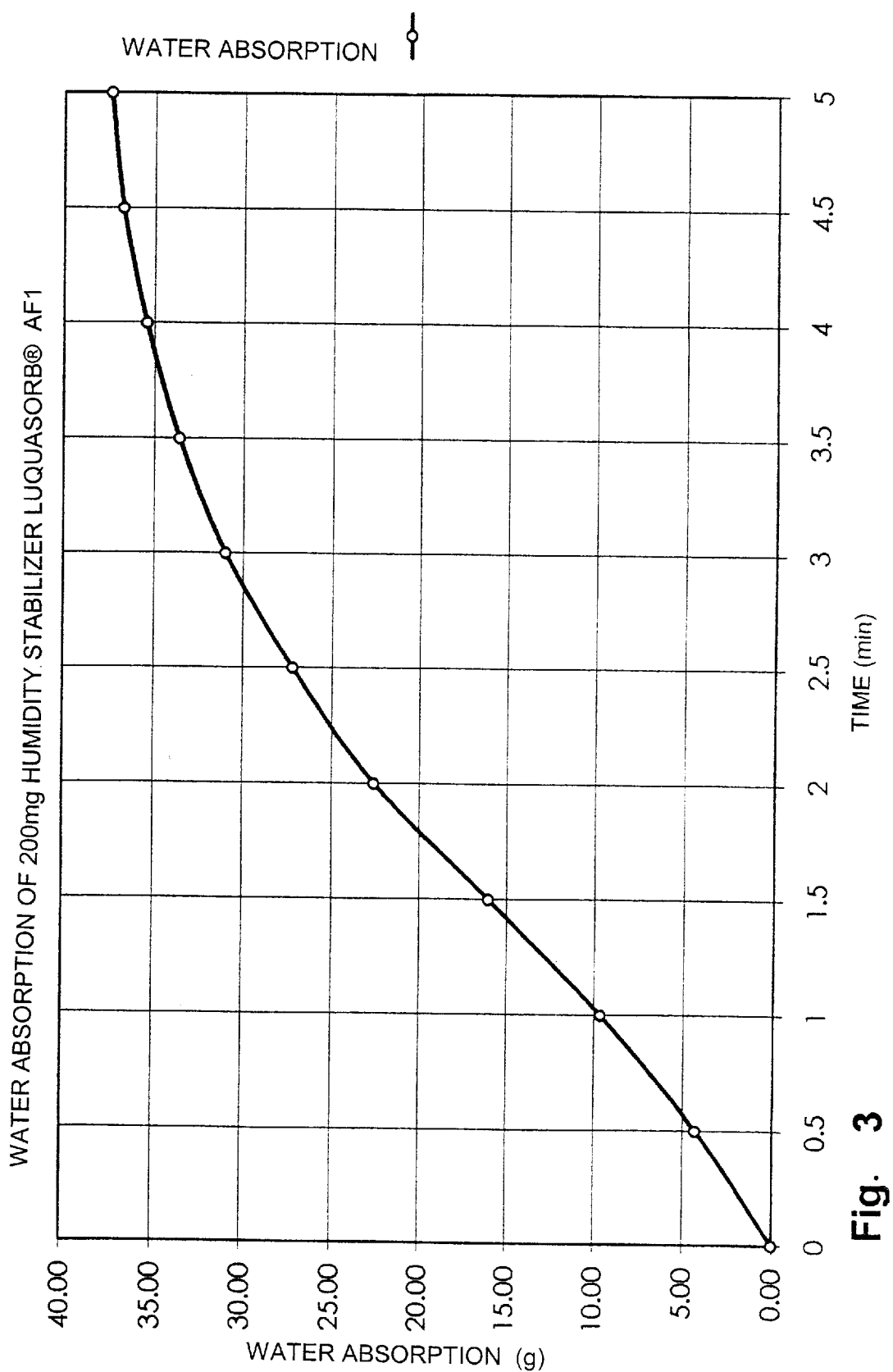

In the following the invention will be explained by example in conjunction with figures. Therein depict:

FIG. 1 perspectively and schematically, the structure of a stabilizer according to the invention in the preferred embodiment, FIG. 2 air humidity fluctuations of the environment as well as in a violin case with 250 $\mu$g Luquasorb® AF1, a cross-linked polyacrylic acid sodium salt in powder form, and FIG. 3 the water absorption over time of Luquasorb® AF1 as an example of a stabilizer substance used according to the invention.

According to FIG. 1, a stabilizer according to the invention comprises a bag 1 of a screen mesh, preferably of a polyamide fabric. The bag is, for example, welded on welding seams 3. It contains a small portion of powder-form stabilizer substance, such as preferably a cross-linked polyacrylic acid sodium salt. The pore width of the bag mesh is preferably between 70 $\mu$m and 120 $\mu$m, in particular preferred it is at least approximately 90 $\mu$m, at any event at a thread thickness which is significantly less than the screen opening width. The moisture-permeable bag 1 is disposed in a protective container 7, for example comprised of a hard plastic material, which has one or several interior openings 9, at least on its one side. The container 7 further is preferably [structured such that] it can be folded open (not shown) in order to exchange the bag 1, for example, for reactivation. It is fixed, for example, with a Velcro tape inside the instrument case.

For activating the stabilizer according to the invention, according to FIG. 3 at least the bag 1 with the stabilizer substance is placed into water for approximately 4 minutes. Subsequently the bag 1, which is now swelled up, with the substance 5 swelled to form a gel is inserted into the protective container 7 and left in the case of the musical instrument. It is understood that the substance activation in water can also take place with the container 7. Depending on the size of the instrument case, for example for violins, violas, celli, basses, one or several of the stabilizers depicted in FIG. 1 are provided in the case, or a greater or smaller stabilizer adapted to the particular size.

According to FIG. 2 in a violin case with 200 mg activated stabilizer substance, a cross-linked polyacrylic acid sodium salt in powder form, at slow ambient humidity fluctuations between 29 and 49% r.a.h., an optimum stabilizing effect was determined thereby that in the instrument case now only humidity fluctuations about the mean value of 56% r.a.h. of ±3% r.a.h. could be measured. This effectiveness of the stabilizer according to the invention was retained over a period of 18 days which, in practice, is extremely important: the rewetting of the provided stabilizer by immersion in water must only take place at large time intervals. The means for retaining the substance in an enclosure such as an instrument case or tobacco container includes the container of FIG. 1, a film for containing the substance, or other means.

What is claimed is:

1. An air humidity stabilizer, in particular for musical instrument cases, comprising:

a stabilizer polymer substance in the form of a hydrophilic, water absorbing cross-linked polyacrylic acid sodium salt present as a non-activated powder form;

means for retaining the substance in an enclosure for stabilizing humidity in the enclosure, the means for retaining comprising a moisture-permeable screen-mesh container, said screen-mesh container comprising a polyamide which has a pore size of 70 $\mu$m to 120 $\mu$m and a thread thickness; and a protective container containing the moisture-permeable container, the protective container having at least one interior air inlet opening.

2. A stabilizer as claimed in claim 1, wherein the pore size is at least approximately 90 $\mu$m, with said thread thickness significantly less than the pore size.

\* \* \* \* \*